US012571922B2

(12) United States Patent
Steele

(10) Patent No.: US 12,571,922 B2
(45) Date of Patent: Mar. 10, 2026

(54) IDENTIFYING UNRELIABLE GLOBAL NAVIGATION SATELLITE SYSTEM (GNSS) DATA

(71) Applicant: Cambridge Mobile Telematics Inc., Cambridge, MA (US)

(72) Inventor: Patrick Robert Steele, Dedham, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/380,522

(22) Filed: Jul. 20, 2021

(65) Prior Publication Data

US 2023/0035856 A1 Feb. 2, 2023

(51) Int. Cl.
*G01S 19/39* (2010.01)
*G01S 19/52* (2010.01)

(52) U.S. Cl.
CPC ............ *G01S 19/396* (2019.08); *G01S 19/52* (2013.01)

(58) Field of Classification Search
CPC ........ G01S 19/396; G01S 19/52; G01S 19/23; G01S 19/20
See application file for complete search history.

(56) References Cited

U.S. PATENT DOCUMENTS

| | | | |
|---|---|---|---|
| 9,228,836 B2 | 1/2016 | Girod et al. | |
| 10,246,037 B1 | 4/2019 | Shea et al. | |
| 11,074,769 B2 | 7/2021 | Balakrishnan et al. | |

| | | | |
|---|---|---|---|
| 2009/0018772 A1 | 1/2009 | Watanabe et al. | |
| 2010/0211270 A1 | 8/2010 | Chin et al. | |
| 2015/0312655 A1 | 10/2015 | Balakrishnan et al. | |
| 2017/0011562 A1* | 1/2017 | Hodges ................ | G09B 29/007 |
| 2018/0188032 A1* | 7/2018 | Ramanandan .......... | G01S 19/52 |
| 2019/0052747 A1* | 2/2019 | Breaux ............. | H04M 1/72454 |
| 2019/0210474 A1* | 7/2019 | Otsuki .................... | B60L 50/66 |
| 2020/0017048 A1 | 1/2020 | Shea et al. | |
| 2020/0074326 A1* | 3/2020 | Balakrishnan .......... | G06F 16/56 |
| 2020/0081134 A1* | 3/2020 | Wheeler .............. | G01S 19/396 |
| 2021/0042844 A1 | 2/2021 | Potter et al. | |
| 2021/0063161 A1 | 3/2021 | Cordova et al. | |

(Continued)

FOREIGN PATENT DOCUMENTS

| | | | | |
|---|---|---|---|---|
| CN | 108107448 | | 6/2018 | |
| CN | 105550702 B | * | 7/2019 | .......... G01S 19/215 |

(Continued)

OTHER PUBLICATIONS

17380522_2022-11-09_KR_102209422_B1_M.pdf, machine translation of KR_102209422_B1 (Year: 2019).*

(Continued)

*Primary Examiner* — William Kelleher
*Assistant Examiner* — Kenneth W Good
(74) *Attorney, Agent, or Firm* — Kilpatrick Townsend & Stockton LLP

(57) ABSTRACT

Techniques for identifying the reliability of global navigation satellite system (GNSS) data include receiving data produced by one or more sensors during a trip within a vehicle, the data including GNSS sensor data and non-GNSS sensor data. Feature data is generated based at least in part on the GNSS sensor data and the non-GNSS sensor data. A reliability of at least a portion of the GNSS sensor data is determined by processing the feature data with a classifier.

18 Claims, 10 Drawing Sheets

(56)     References Cited

U.S. PATENT DOCUMENTS

| | | | | |
|---|---|---|---|---|
| 2021/0215485 A1* | 7/2021 | Ishigami | ................. | G01S 19/52 |
| 2021/0304527 A1* | 9/2021 | Hagiwara | .............. | G07C 5/008 |
| 2021/0333409 A1* | 10/2021 | Cao | ......................... | G01S 19/40 |
| 2022/0338014 A1* | 10/2022 | Luomi | .................. | H04W 12/66 |

FOREIGN PATENT DOCUMENTS

| | | | | |
|---|---|---|---|---|
| KR | 101582840 | 1/2016 | | |
| KR | 102209422 B1 * | 2/2021 | ............. | G09B 9/052 |

OTHER PUBLICATIONS

17380522_2022-11-09_CN_105550702_B_M.pdf, machine translation of CN_105550702_B (Year: 2019).*
PCT International Search Report and Written Opinion in International Appln. No. PCT/US2022/073887, dated Nov. 4, 2022, 11 pages.
Extended European Search Report in European Appln. No. 22846791.3, mailed on Oct. 4, 2024, 7 pages.

* cited by examiner

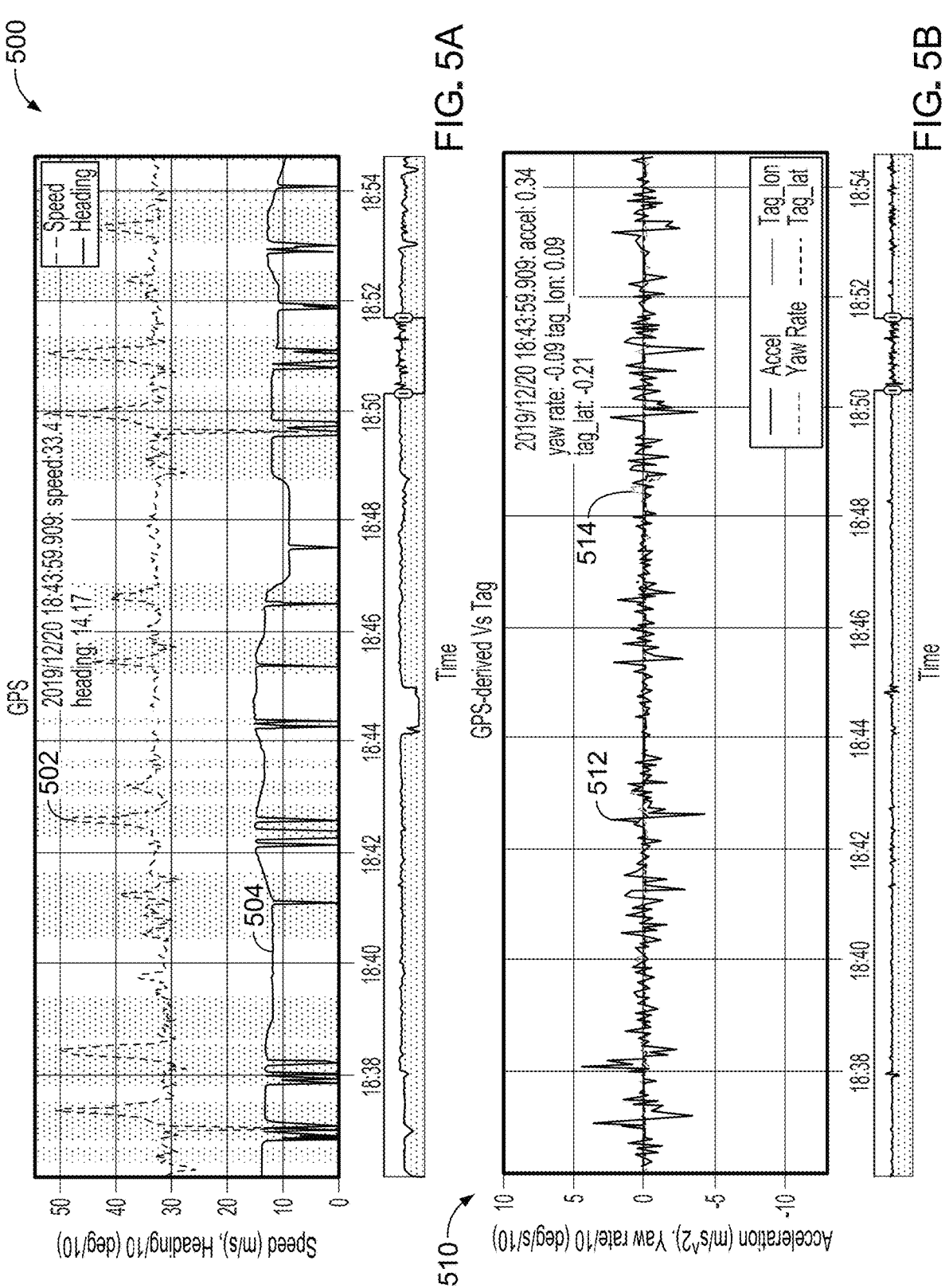

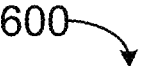

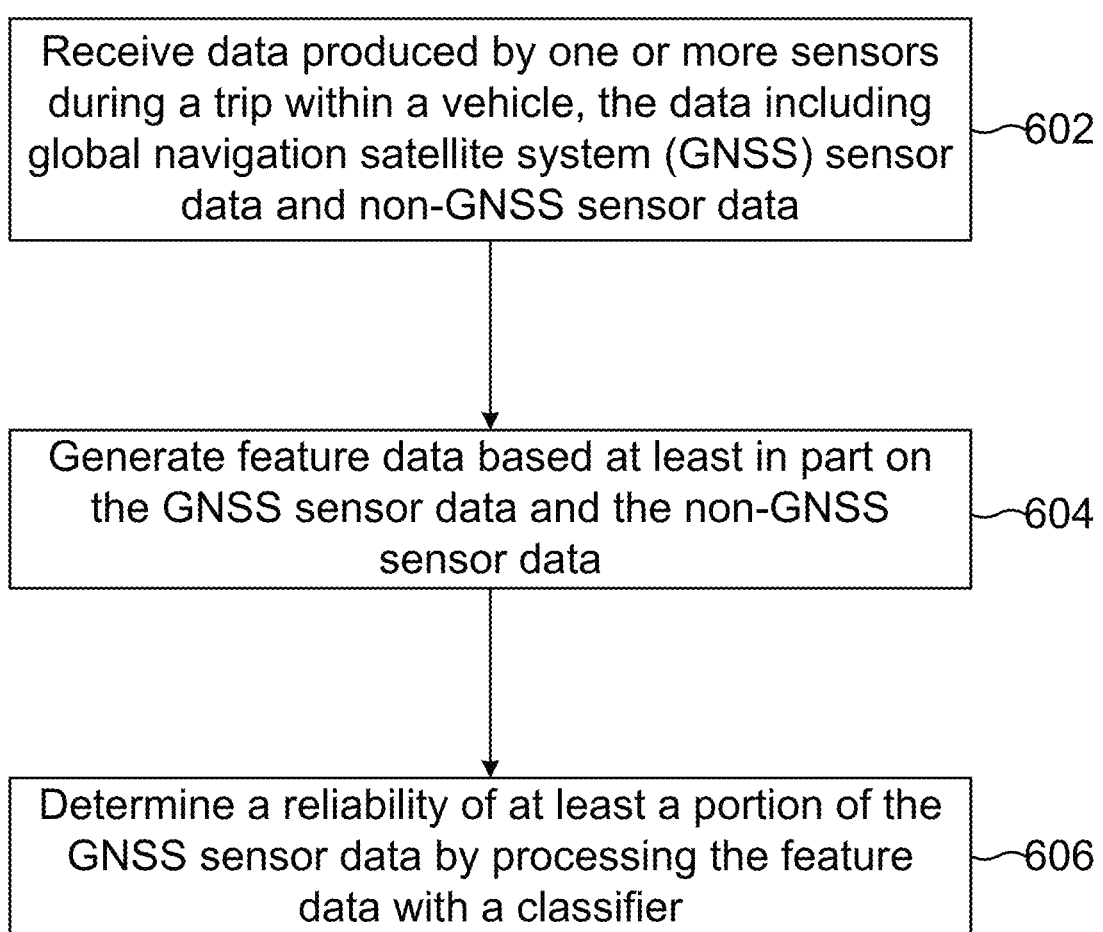

Receive data produced by one or more sensors during a trip within a vehicle, the data including global navigation satellite system (GNSS) sensor data and non-GNSS sensor data ⎯602

Generate feature data based at least in part on the GNSS sensor data and the non-GNSS sensor data ⎯604

Determine a reliability of at least a portion of the GNSS sensor data by processing the feature data with a classifier ⎯606

FIG. 6

IDENTIFYING UNRELIABLE GLOBAL NAVIGATION SATELLITE SYSTEM (GNSS) DATA

TECHNICAL FIELD

This disclosure relates generally to techniques for identifying reliable and unreliable data from a global navigation satellite system (GNSS).

BACKGROUND

GNSS, such as the United States' global positioning system (GPS), use a network of satellites to provide position and time information to end users. In these systems, each satellite continually broadcasts a signal that includes information regarding the time of transmission and the satellite's position at that time. A receiver situated on or near the Earth's surface uses the signals from multiple satellites to determine its own position (e.g., longitude, latitude, and altitude) and time. The receiver can provide this information to a coupled device (e.g., a mobile device) for use in applications such as navigation, tracking, and telematics, among others.

SUMMARY

In general, in a first aspect, a computer-implemented method for identifying the reliability of GNSS data includes: receiving data produced by one or more sensors during a trip within a vehicle, the data including GNSS sensor data and non-GNSS sensor data; generating feature data based at least in part on the GNSS sensor data and the non-GNSS sensor data; and determining a reliability of at least a portion of the GNSS sensor data by processing the feature data with a classifier.

In general, in a second aspect combinable with the first aspect, the method includes generating an assessment of a driver of the vehicle during the trip based at least in part on the GNSS sensor data and the reliability of at least the portion of the GNSS sensor data, in which generating the assessment includes disregarding one or more segments of the portion of the GNSS sensor data that is classified as unreliable.

In general, in a third aspect combinable with the first or second aspects, the GNSS sensor data includes GNSS-measured speed of the vehicle, and generating the feature data includes deriving GNSS acceleration of the vehicle based on the GNSS-measured speed of the vehicle.

In general, in a fourth aspect combinable with any of the first through third aspects, generating the feature data includes generating a GNSS-implied specific power of the vehicle by multiplying the GNSS-measured speed by the GNSS acceleration.

In general, in a fifth aspect combinable with any of the first through fourth aspects, the GNSS sensor data includes GNSS-measured heading of the vehicle, and generating the feature data includes deriving GNSS yaw rate of the vehicle based on the GNSS-measured heading of the vehicle.

In general, in a sixth aspect combinable with any of the first through fifth aspects, the non-GNSS sensor data includes one or more of accelerometer data, magnetometer data, or gyroscope data.

In general, in a seventh aspect combinable with any of the first through sixth aspects, the GNSS sensor data and the non-GNSS sensor data are produced by a mobile device within the vehicle during the trip.

In general, in an eighth aspect combinable with any of the first through seventh aspects, the GNSS sensor data is received from location services of the mobile device by an application executing on the mobile device.

In general, in a ninth aspect combinable with any of the first through eighth aspects, the GNSS sensor data is produced by a mobile device within the vehicle during the trip, and the non-GNSS sensor data is produced by a telematics device within the vehicle during the trip.

In general, in a tenth aspect combinable with any of the first through ninth aspects, the classifier includes a support vector machine model trained to classify the GNSS sensor data as reliable or unreliable based on the feature data.

In general, in an eleventh aspect, a system for identifying the reliability of GNSS data includes at least one processor and memory storing instructions which, when executed by the at least one processor, cause the at least one processor to perform the operations of any of the first through tenth aspects.

In general, in a twelfth aspect, a non-transitory computer-readable medium stores instructions for identifying the reliability of GNSS data which, when executed by at least one processor, cause the at least one processor to perform the operations of any of the first through tenth aspects.

The details of one or more implementations are set forth in the accompanying drawings and the description below. The techniques described here can be implemented by one or more systems, devices, methods, or non-transitory computer-readable media, among others. Other features and advantages will be apparent from the description and drawings, and from the claims.

BRIEF DESCRIPTION OF DRAWINGS

FIGS. 5A and 5B illustrate example charts of reliable and unreliable GNSS data.

FIG. 6 illustrates an example processes for identifying the reliability of GNSS data.

Like reference symbols in the various drawings indicate like elements.

DETAILED DESCRIPTION

Many modern-day smartphones and other mobile devices include a GNSS receiver (sometimes referred to as a GNSS sensor) to support a wide variety of services. In some examples, an operating system executing on the mobile device processes signals received from the GNSS sensor to determine the position and speed of the device over time. The operating system can then provide this information to applications executing on the mobile device to enable their functionality. For example, the DriveWell™ application developed by Cambridge Mobile Telematics of Cambridge, Massachusetts uses time-dependent position and speed information made available by the operating system to determine where a user of the mobile device is driving, and how fast they are going.

Typically, the GNSS sensor allows the mobile device to resolve its position and speed (and other parameters) with a high degree of accuracy. However, in some instances, the information provided by the GNSS sensor is unreliable. For example, when the line of sight path between the GNSS sensor and a satellite is obstructed, the signal received from the satellite may be significantly attenuated or blocked entirely. As another example, reflections or diffractions of satellite signals due to buildings or other objects can lead to multipath errors at the GNSS sensor. In these and other scenarios, the position or speed reported by the mobile device can be erroneous. For example, these errors can result in so-called "speed spikes" in which the reported GNSS speed far exceeds what is possible or plausible during normal operation. As a result, applications (such as the aforementioned DriveWell™ application) which rely on the reported GNSS speed for driver assessment may penalize a driver for excessive speeding when they are not actually speeding, resulting in poor application performance and user disengagement.

The techniques described here use data from non-GNSS sensors to identify instances of reliable and unreliable GNSS data in order to avoid using unreliable data during driver assessment. In particular, contemporaneous GNSS data (e.g., GNSS-measured speed) and non-GNSS data (e.g., three-axis acceleration from an accelerometer) are processed to generate feature data. The feature data is fed into a GNSS reliability classifier, such as a SVM or other machine-learning model, which processes the feature data to classify portions of the GNSS data as either reliable or unreliable. A driver assessment engine uses the reliability classifications to filter out portions of the GNSS data that are deemed unreliable. In this manner, the driver assessment engine avoids unfairly penalizing a driver for erroneous sensor data, thereby increasing the accuracy of driver assessment and improving user engagement. Other uses of the reliability classifications, such as in crash identification and reconstruction and in frame-of-reference orientation, are also described.

Figure 1:
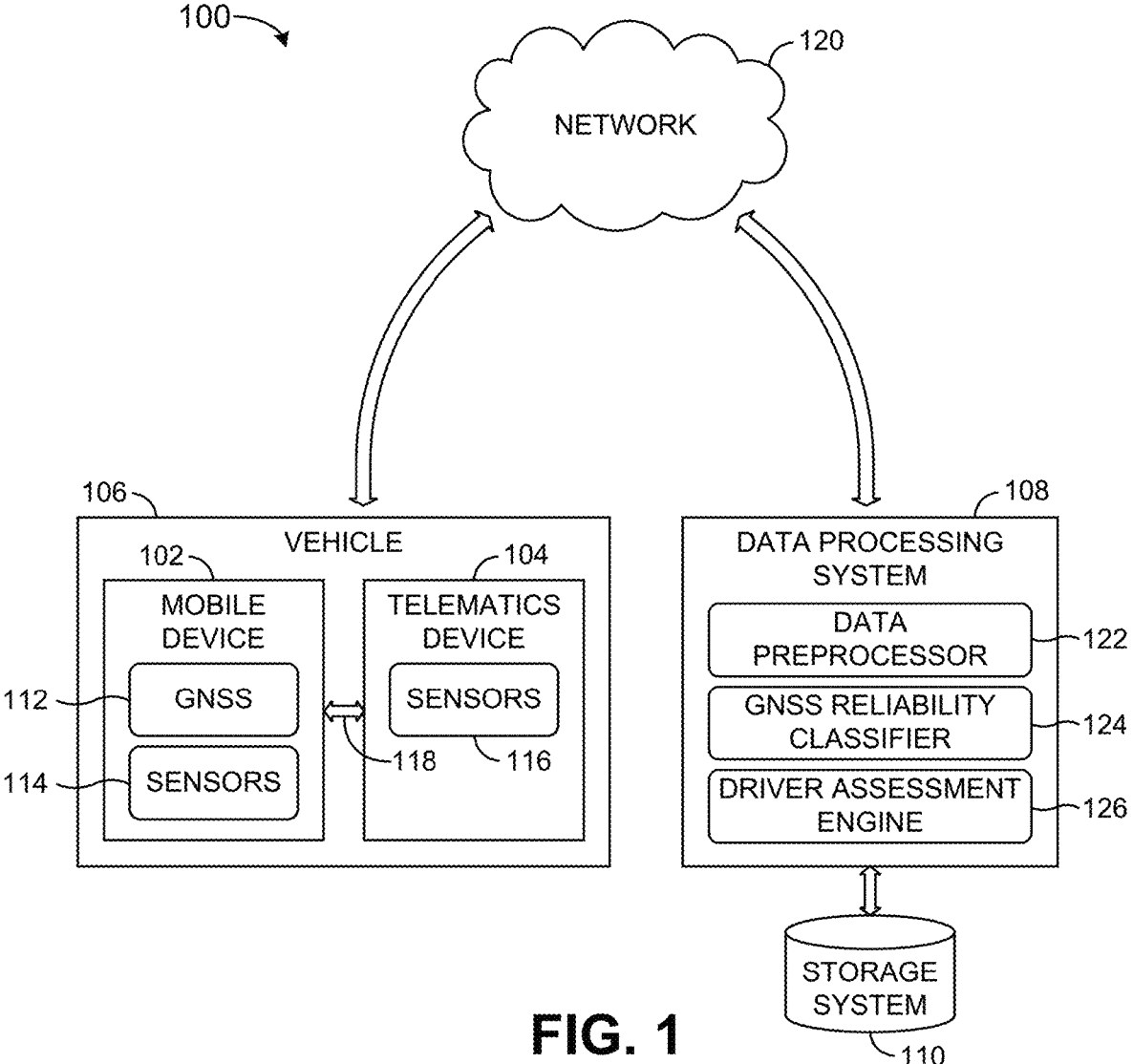
FIG. 1 illustrates an example system for identifying the reliability of GNSS data.

FIG. 1 illustrates an example system 100 for identifying the reliability of GNSS data. In this example, the system 100 includes a mobile device 102 and a telematics device 104 within a vehicle 106, a data processing system 108, and a storage system 110. In general, the mobile device 102 can be a portable electronic device (e.g., a smartphone, tablet, or wearable device) that includes a GNSS sensor 112 and one or more non-GNSS sensors 114. The GNSS sensor 112 can process signals received from multiple satellites in order to determine information such as the position (e.g., latitude, longitude, and altitude), speed, and heading of the mobile device 102. The non-GNSS sensors 114 can include an accelerometer configured to measure three-axis acceleration of the mobile device 102, a gyroscope configured to measure three-axis rotation of the mobile device 102, a magnetometer configured to measure the heading of the mobile device 102, or combinations of them, among others. In this manner, the sensors 112, 114 can produce time-dependent position and motion data for the mobile device 102, and therefore the vehicle 106, over the course of a trip (e.g., an instance of travel between a starting location and an ending location). In some examples, an application executing on the mobile device 102 is configured to receive the data captured by the sensors 112, 114 (e.g., through location services or other services provided by the operating system of the mobile device 102). The application can then cause the mobile device 102 to store the data in a storage medium and forward the data to the data processing device 108, as described below.

In some examples, the telematics device 104 is an original equipment manufacturer (OEM) telematics device installed during manufacture of the vehicle 106, or a telematics device connected to an on-board diagnostics (OBD) port of the vehicle 106. In some examples, the telematics device 104 is a tag device that is placed or affixed in (but not electrically connected to) the vehicle 106, such as tag device of the kind described in U.S. patent application Ser. No. 14/529,812, titled "System and Method of Obtaining Vehicle Telematics data," the entire contents of which is incorporated herein by reference. In some example, the telematics device 104 is a video tag device capable of image and video capture, such as the video tag device of the kind described in U.S. patent application Ser. No. 16/407,502, titled "Safety for Vehicle Users," the entire contents of which is incorporated herein by reference.

The telematics device 104 includes one or more non-GNSS sensors 116 that can augment or serve in place of the non-GNSS sensors 114 of the mobile device 102. For instance, in some examples, the sensors 116 include an accelerometer, magnetometer, gyroscope, or combinations of them, among others, and the telematics device 104 transmits the data captured by the sensors 116 to the mobile device 102 over a network 118 (e.g., a Bluetooth network, a Wi-Fi network, etc.) when the mobile device 102 is present and communicatively coupled. In some examples, the data captured by the telematics device 104 can be further processed, possibly in conjunction with additional data, to provide further features. An example is found in U.S. patent application Ser. No. 13/832,456, titled "Inference of vehicular trajectory characteristics with personal mobile devices," the entire contents of which is incorporated herein by reference. In other examples, the system 100 does not include a telematics device 104, and the non-GNSS sensor data is produced solely by the sensors 114 of the mobile device 102.

At times, the mobile device 102 (or the telematics device 104) can provide the GNSS and non-GNSS data produced by one or more of the sensors 112, 114, 116 to a local (e.g., in-vehicle) or remote data processing system 108 over a wired and/or wireless network 120. In general, the data processing system 108 is configured to process the GNSS and non-GNSS data to identify instances in which the GNSS data is unreliable. To facilitate this analysis, the data processing system 108 includes a data preprocessor 122 configured to generate feature data from the GNSS and/or non-GNSS data, and a GNSS reliability classifier 124 configured to process the feature data to classify the GNSS data (or portions thereof) as reliable or unreliable. In some examples, the data processing system 108 also includes a driver assessment engine 126 configured to assess the driver of the vehicle 106 based on the GNSS data (and, in some cases, the non-GNSS data) along with its corresponding reliability classifications. For example, if the GNSS data or a portion thereof is classified as unreliable, the driver assessment engine 126 can filter out or otherwise disregard the unreliable data when assessing the driver of the vehicle 106, thereby improving the accuracy of the assessment and avoiding penalizing the driver for sensor error. The data processing system 108 can store the data and analysis results in the storage system 110 for subsequent analysis and/or presentation to one or more users.

Figure 2A:
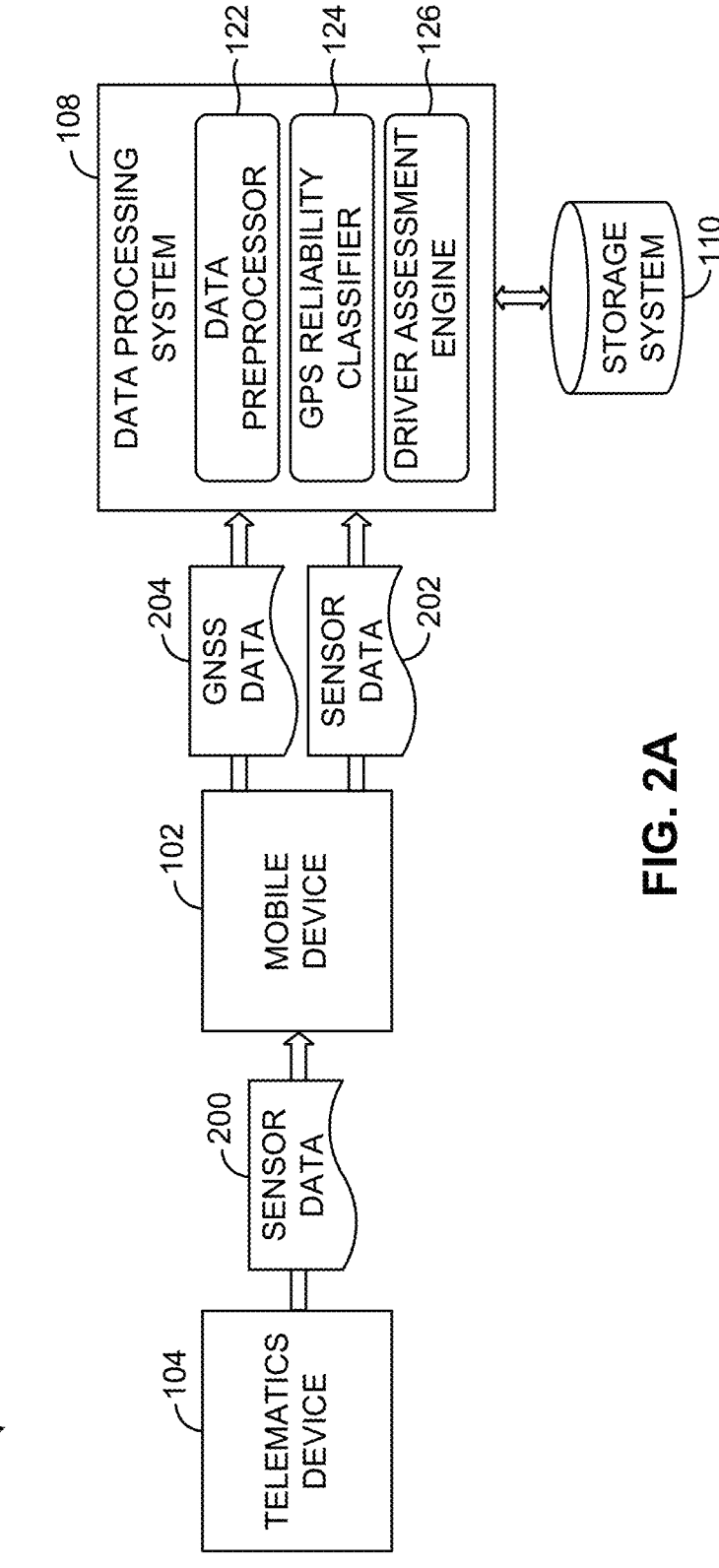
FIGS. 2A-2C illustrate an example diagram of identifying the reliability of GNSS data.

Referring to FIG. 2A, in operation, the telematics device 104 provides sensor data 200 to the mobile device 102. For example, an application executing on the mobile device 102 can cause the mobile device 102 to communicatively couple with the telematics device 104 over the network 118 to request or otherwise receive the sensor data 200. In some examples, the sensor data 200 includes raw or processed accelerometer data, magnetometer data, gyroscope data, or combinations of them, among other non-GNSS data produced by the sensors 116 of the telematics device 104 during one or more trips in the vehicle 106. After receiving the sensor data 200, the mobile device 102 can augment its own non-GNSS sensor data with the sensor data 200 to produce sensor data 202. In some examples, such as when the mobile device 102 does not include one or more non-GNSS sensors, the mobile device 102 can use some or all of the sensor data 200 as a substitute for its own non-GNSS data.

The mobile device 102 provides the non-GNSS sensor data 202 and GNSS sensor data 204 to the data processing system 108. For example, the application executing on the mobile device 102 can cause the mobile device 102 to communicatively couple with the data processing system 108 over the network 120 to provide the sensor data 202, 204 to the data processing system 108. The mobile device 102 can provide the sensor data 202, 204 to the data processing system 108 in real or near-real time, in a batch transmission (e.g., after completion of one or more trips), or in response to a triggering event, such as a request from the data processing system 108 or detection by the mobile device 102 of a successful connection to a particular network type (e.g., a Wi-Fi network).

Figure 2B:
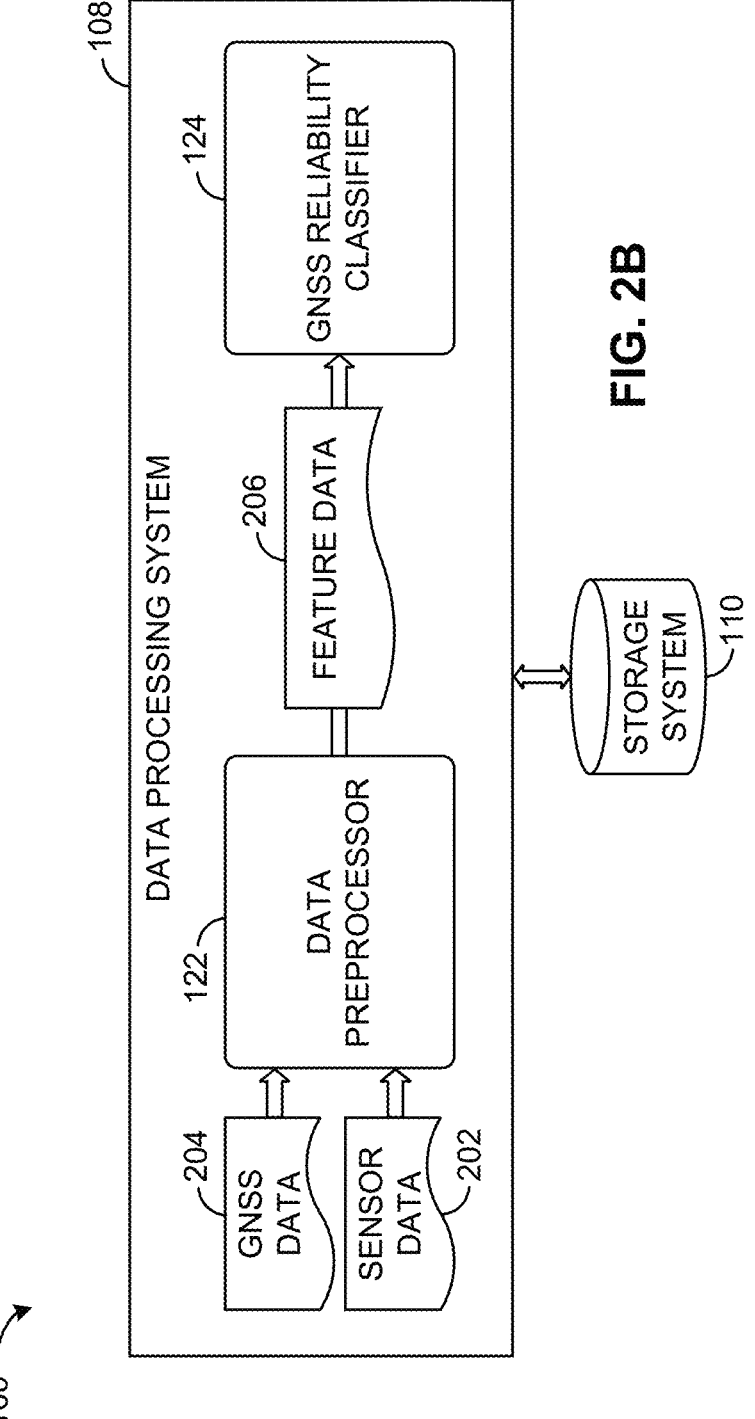

Upon receipt of the sensor data 202, 204, the data processing system 108 processes the data using the data preprocessor 122, as shown in FIG. 2B. In general, the data preprocessor 122 is configured to process the GNSS sensor data 204 alone or in combination with the non-GNSS sensor data 202 to produce feature data 206. For example, the GNSS sensor data 204 can include GNSS speed as a function of time, and the data preprocessor 122 can derive a GNSS acceleration signal (e.g., a longitudinal acceleration signal) from the GNSS speed signal for inclusion in the feature data 206. As another example, the GNSS sensor data 204 can include GNSS heading as a function of time, and the data preprocessor 122 can derive a GNSS yaw rate signal (sometimes referred to as a heading rate) from the GNSS heading signal for inclusion in the feature data 206.

In some examples, the data preprocessor 122 can include raw or processed non-GNSS sensor data 202 as feature data 206. For example, the data preprocessor 206 can provide one, two, or three axes acceleration signals produced by the mobile device 102 and/or the telematics device 104 and included in the non-GNSS sensor data 202 as feature data 206. In some examples, the non-GNSS sensor data 202 can include one, two, or three axes gyroscope signals, and the data preprocessor 122 can derive gyroscope (e.g., non-GNSS) yaw rate signal(s) from the gyroscope signal(s) for inclusion in the feature data 206.

In some examples, the data preprocessor 122 can combine the GNSS sensor data 204 and the non-GNSS sensor data 202 to produce feature data 206. For example, the data preprocessor 122 can extend the nominal GNSS speed signal included in the GNSS sensor data 204 by integrating the longitudinal acceleration signal included in the non-GNSS sensor data 202 to produce a predicted speed signal for inclusion in the feature data 206. As non-limiting examples, the data preprocessor 122 can include one or more of the following signals in the feature data 206 in addition to or instead of the signals described herein: GNSS-implied power (e.g., specific power) produced by multiplying the GNSS speed signal included in the GNSS sensor data 204 by the GNSS derived acceleration signal; predicted-speed-implied power (e.g., specific power) produced by multiplying the GNSS speed signal included in the GNSS sensor data 204 by the acceleration signal included in the non-GNSS sensor data 202; windowed GNSS speed quantiles; forward-looking predicted-observed speed error; backward-looking predicted-observed speed error; combinations (e.g., sums or differences) of any of the signals described herein; and derived estimates of times when various sensors are reliable, among others.

Figure 2C:
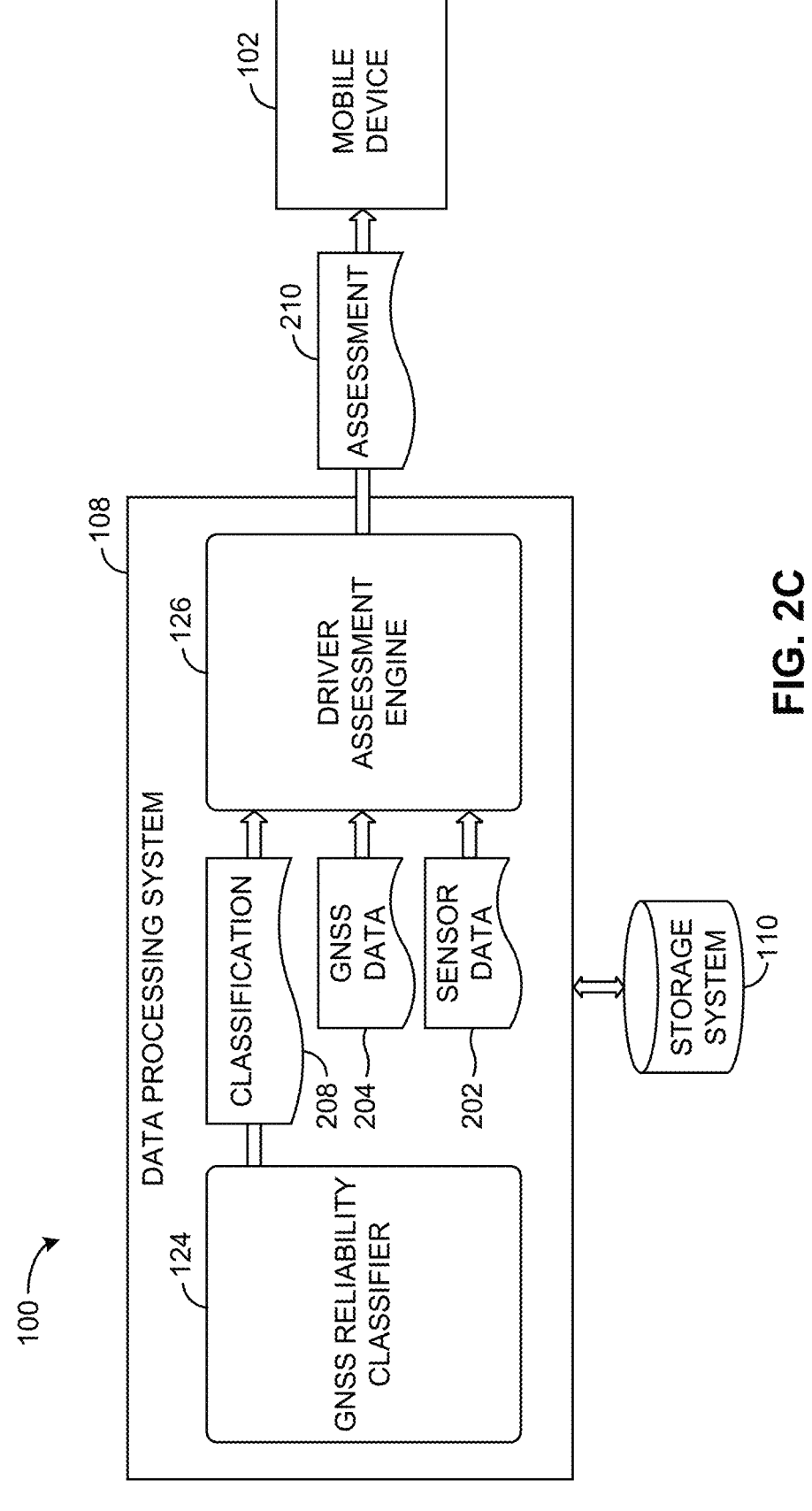

After producing the feature data 206, the data preprocessor 122 provides the feature data to the GNSS reliability classifier 124. Referring to FIG. 2C, the GNSS reliability classifier 124 processes the feature data 206 to produce a classification 208 for one or more portions (e.g., timestamps or time periods) of the GNSS data 204 as either reliable or unreliable. In some examples, the GNSS reliability classifier 124 employs a trained support vector machine (SVM) model to produce the classifications 208. The SVM can use a Gaussian kernel over some or all of the features 206 described here. In some examples, the SVM is trained using GNSS and/or non-GNSS sensor data from trips that have been labeled as having GNSS speed spikes (e.g., unreliable GNSS data) and not having GNSS speed spikes (e.g., reliable GNSS data). In some examples, a user of the application executing on the mobile device 102 can provide feedback indicating that one or more of their previous trips include unusual speeds (e.g., speed spikes), and the data corresponding to those trips can be used for further training. In some examples, the GNSS reliability classifier 124 can use other supervised or unsupervised machine learning approaches instead of or in addition to the SVM model without departing from the scope of the present disclosure.

In some examples, the GNSS reliability classifier 124 provides the classifications 208 to the driver assessment engine 126. The driver assessment engine 126 uses the GNSS sensor data 204 (e.g., GNSS-measured speed) and the corresponding classifications 208 to produce an assessment 210 of the driving performance or behavior of the user (e.g., the user of the mobile device 102 who is driving the vehicle 106). In some examples, other features from the GNSS sensor data 204 (e.g., the derived GNSS yaw rate) and/or the non-GNSS sensor data 202 (e.g., acceleration or yaw rate) are used to generate the assessment 210. The driver assessment engine 126 can also use additional data stored in the storage system 110, such as speed limit data or average speed data for the roads traversed during the trip, to produce the assessment 210.

In some examples, the assessment 210 includes a score for the driver during the trip, which can be combined with scores from one or more other trips by the driver. Such a score can be calculated based on, for example, a number of speeding events during the trip, a number of speeding events above a particular threshold (e.g., over 10 miles per hour above the speed limit) during the trip, an average or maximum speed for the trip, an average or maximum speed above the speed limit for the trip, or combinations of them, among others. In some examples, the driver assessment engine 126 can generate the assessment 210 using the techniques described in, for example, U.S. patent application Ser. No. 16/559,711, titled "Systems and Methods for Classifying Driver Behavior," the entire contents of which is incorporated herein by reference.

In order to ensure that the driver is not penalized for speed spikes or other unreliable GNSS speed data when they are not actually speeding, the driver assessment engine 126 is configured to filter out or otherwise ignore portions of the GNSS sensor data 204 that are classified as unreliable. In this manner, the driver will not be unfairly penalized for erroneous sensor data, thereby increasing the accuracy of driver assessment and improving user engagement. In some examples, the assessment 210 is provided to the mobile device 102 of the driver, which can cause the application executing on the mobile device 102 to display a graphical user interface with a presentation of the assessment 210. The presentation of the assessment 210 can include the computed score and an annotated map identify portions of the trip trajectory where the driver is deemed to have been speeding. In some examples, portions of the trip trajectory where the GNSS speed data is classified as unreliable (and/or reliable) are identified on the map. The driver can review the assessment 210 and can dispute or otherwise provide feedback on the assessment (which can be used to further train the GNSS reliability classifier 124, as described above). In some examples, the assessment 210 is also stored in the storage system 110 and/or presented to a third party, such as an insurance analyst operating on a remote computing device.

In some examples, the system 100 can use the classifications 208 for other analysis instead of or in addition to producing the driver assessment 210. For example, in order to properly extract a vehicle's acceleration, braking, and cornering patterns using a mobile device, the mobile device should be oriented to the frame of reference of the vehicle. An example of such orientation methods are described in U.S. patent application Ser. No. 13/832,456, titled "Inference of vehicular trajectory characteristics with personal mobile devices," the entire contents of which is incorporated herein by reference. However, unreliable GNSS data may confuse such measurements, resulting in improper orientation and inaccurate data extraction. To improve these orientation methods, unreliable GNSS data can be identified as described herein and filtered out or otherwise disregarded during orientation. As another example, GNSS velocity information can be used to identify and reconstruct crashes, such as described in U.S. patent application Ser. No. 16/035,861, titled "Vehicle Telematics of Vehicle Crashes," the entire contents of which is incorporated herein by reference. By identifying and removing unreliable GNSS data from this process, crash identification and reconstruction can be improved.

Figures 3A, 3B:
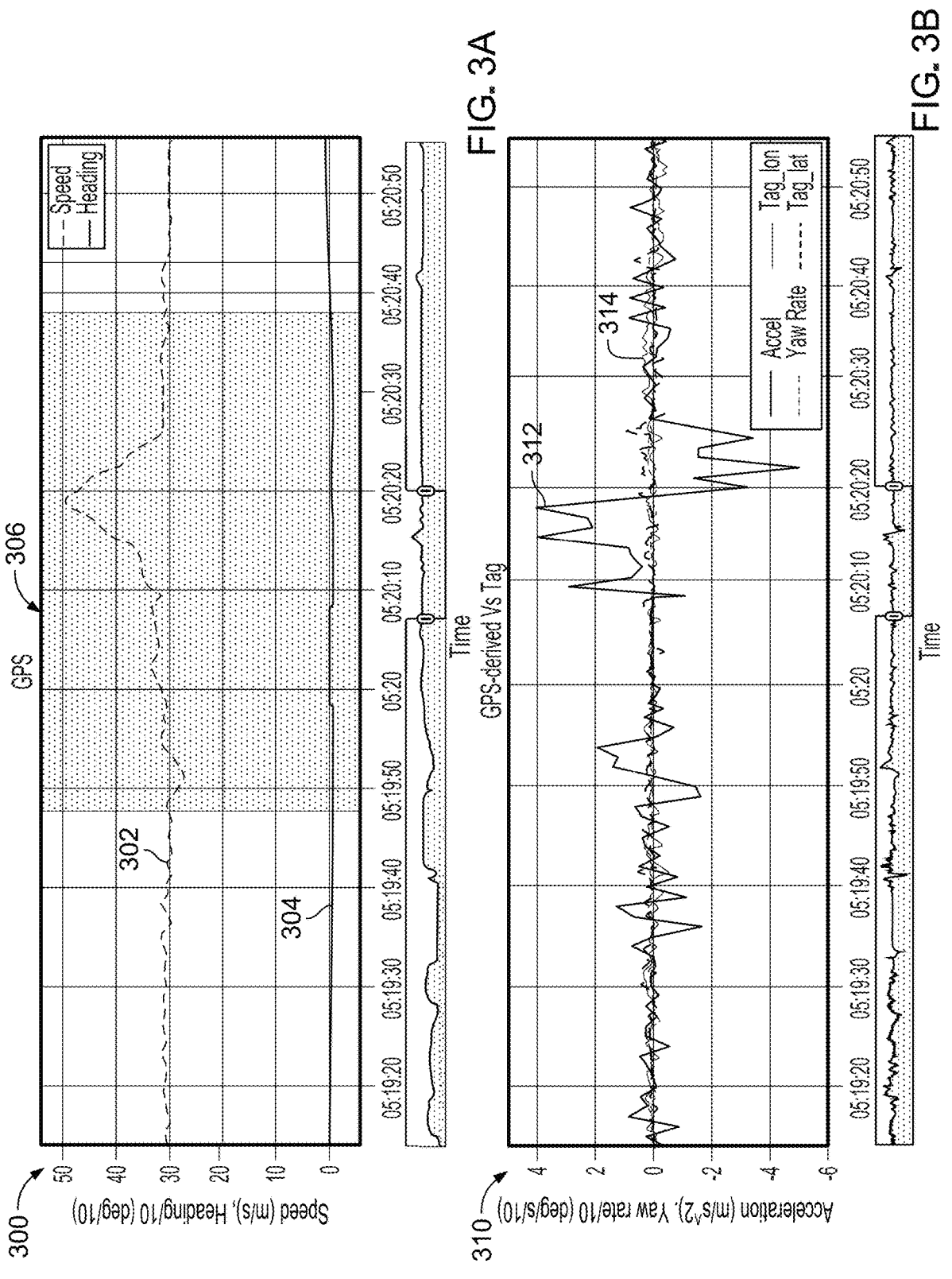
FIGS. 3A-3C illustrate example charts of reliable and unreliable GNSS data.
Figure 3C:
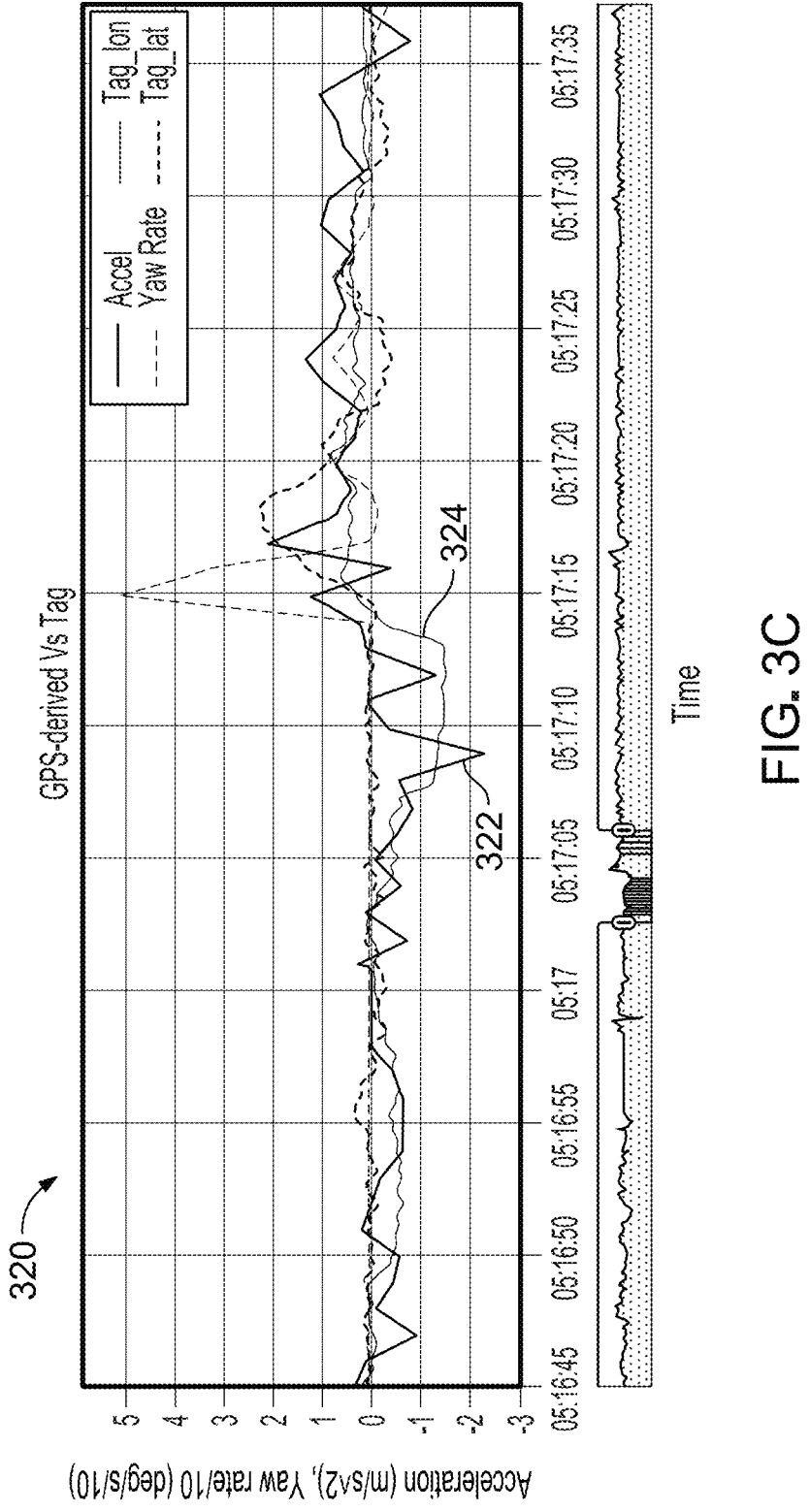

FIGS. 3A-3C illustrate examples of reliable and unreliable GNSS data in accordance with an aspect of the present disclosure. Referring to FIG. 3A, a chart 300 with GNSS-measured speed 302 (in meters per second) and GNSS-measured heading 304 is shown. In this example, the shaded area 306 indicates the period of time for which the GNSS reliability classifier (e.g., the GNSS reliability classifier 124) has determined that the GNSS-measured speed 302 is unreliable (whereas the unshaded areas are deemed reliable). As shown, the driver was traveling at a nearly constant speed for some time. However, beginning around 5:19:50, the driver's speed begins to show a gradual acceleration, followed by a deceleration beginning around 15:20:20. This behavior seems entirely plausible.

However, a chart 310 shown in FIG. 3B of the GNSS acceleration 312 (e.g., as derived from the GNSS-measured speed 302) and the non-GNSS longitudinal acceleration 314 (e.g., as measured by an accelerometer of the mobile device 102 or the telematics device 104) tells a different story. As shown, the non-GNSS longitudinal acceleration 314 is close to zero and fairly stable, with typical measurements between −0.25 and $$0.25 \frac{m}{s^2}.$$

On the other hand, the GNSS acceleration 312 imply acceleration values in excess of $$-3 \frac{m}{s^2}$$

to $$3 \frac{m}{s^2}.$$

This deviation is well beyond what can be attributed to intrinsic sensor bias, thus indicating that the GNSS data is unreliable during this period.

FIG. 3C shows a chart 320 from another time period of the data shown in FIG. 3B. As can be seen from this figure, there is a broad agreement between the GNSS acceleration 322 and the non-GNSS longitudinal acceleration 324, thus implying that the GNSS data is reliable during this period. Note that the GNSS measurements are taken at 1 Hz and the accelerometer measurements are taken at 10 Hz in this example, so some deviation between these signals is expected.

Figures 4A, 4B:
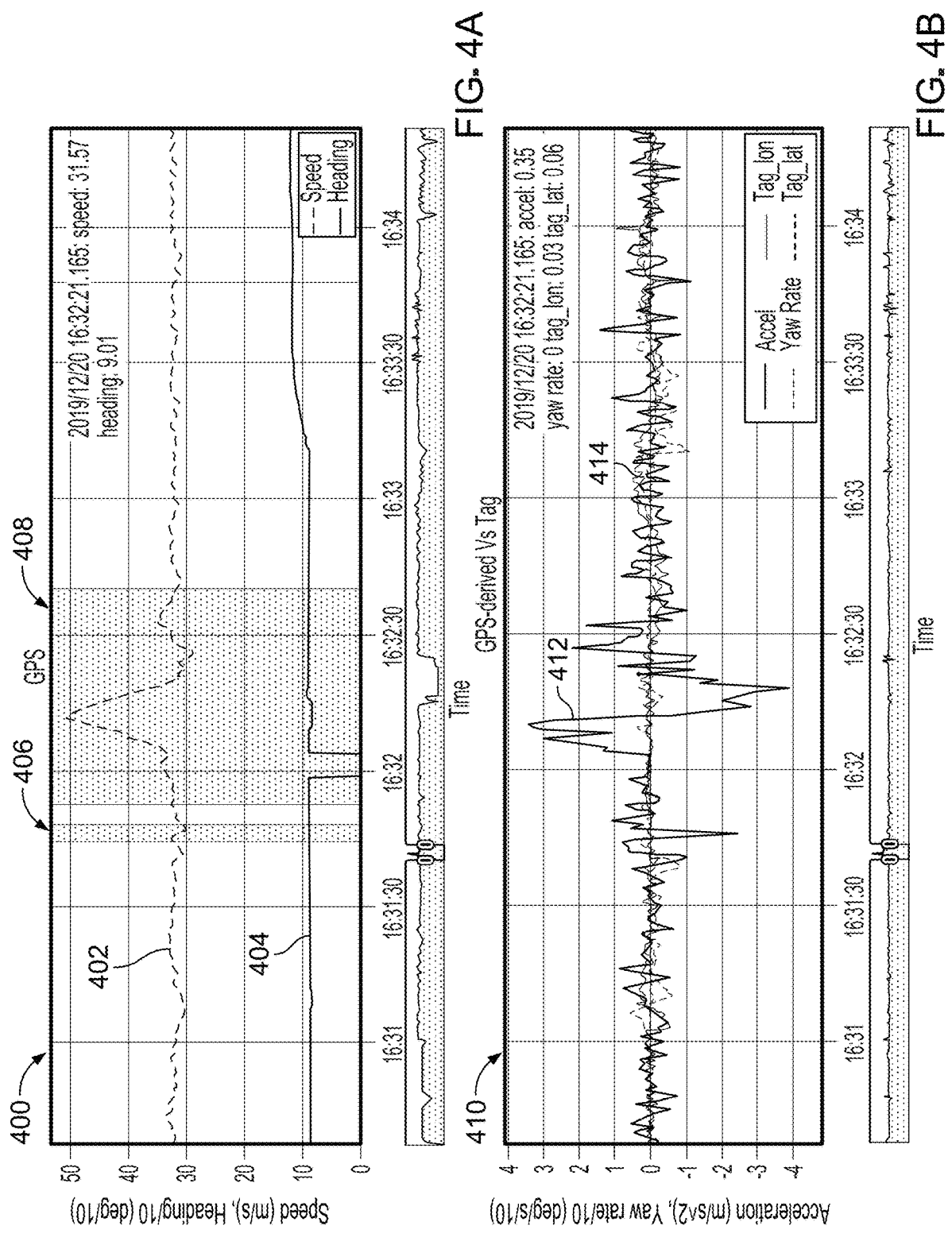
FIGS. 4A and 4B illustrate example charts of reliable and unreliable GNSS data.

FIGS. 4A and 4B illustrate further examples of reliable and unreliable GNSS data. Referring to FIG. 4A, a chart 400 with GNSS-measured speed 402 and GNSS-measured heading 404 is shown. In this example, the shaded areas 406 and 408 indicate periods of time for which the GNSS reliability classifier (e.g., the GNSS reliability classifier 124) has determined that the GNSS-measured speed 402 is unreliable (whereas the unshaded areas are deemed reliable). As shown, the driver was traveling at a nearly constant speed for some time. Beginning around 16:32, the driver's speed begins to show a rather steep but plausible acceleration, followed by a deceleration beginning around 16:32:15. Similar to the example shown in FIG. 3A, this behavior seems entirely possible. However, a chart 410 shown in FIG. 4B of the GNSS acceleration 412 (e.g., as derived from the GNSS-measured speed 402) and the non-GNSS longitudinal acceleration 414 (e.g., as measured by an accelerometer of the mobile device 102 or the telematics device 104) shows that the GNSS data is unreliable during the identified periods 406, 408, as there is a large deviation between the GNSS acceleration 412 and the non-GNSS longitudinal acceleration 414.

FIGS. 5A and 5B illustrate further examples of reliable and unreliable GNSS data. Referring to FIG. 5A, a chart 500 with GNSS-measured speed 502 and GNSS-measured heading 504 is shown. In this example, the periods of instability (indicated by the shaded areas) are quite regular and extreme. This unreliability is confirmed by chart 510 shown in FIG. 5B, as the derived GNSS acceleration 512 is uncorroborated by the non-GNSS longitudinal acceleration 514.

FIG. 6 illustrates an example process 600 for identifying the reliability of GNSS data. In some examples, the electronic device(s), system(s), or component(s), or portions or implementations thereof, of FIGS. 1 and 2 are configured to perform the process 600, such as the mobile device 102, the tag device 104, or the data processing system 108, or combinations of them, among others.

Operations of the process 600 include receiving 602 GNSS sensor data and non-GNSS sensor data produced by one or more sensors during a trip within a vehicle. The GNSS sensor data can include a GNSS-measured speed of the vehicle and/or a GNSS-measured heading of the vehicle during the trip (or a portion thereof). The non-GNSS sensor data can include accelerometer data, magnetometer data, or gyroscope data, or combinations of them, among others, for the vehicle during the trip (or a portion thereof). In some examples, the GNSS sensor data and the non-GNSS sensor data are produced by sensors of a mobile device within the vehicle during the trip (e.g., the sensors 112, 114 of the mobile device 102). In some examples, the GNSS sensor data is produced by a sensor of a mobile device within the vehicle during the trip (e.g., the GNSS sensor 112 of the mobile device 102), and the non-GNSS sensor data is produced by sensor(s) of a telematics device within the vehicle during the trip (e.g., the sensors 116 of the telematics device 104).

The GNSS sensor data and the non-GNSS sensor data can be received by at least one processor included in, for example, the mobile device 102, the tag device 104, or the data processing system 108. In some examples, the GNSS sensor data and/or the non-GNSS sensor data are received by an application executing on a mobile device (e.g., at least one processor executing an application on the mobile device). For example, the GNSS sensor data can be received from location services of the mobile device by the application executing on the mobile device. In some examples, the GNSS sensor data and the non-GNSS sensor data is time-stamped and/or time synchronized. The GNSS sensor data and the non-GNSS sensor data can be received in real time, near-real time, or in a batch mode (e.g., after the trip in the vehicle is complete).

Feature data is generated 604 based at least in part on the GNSS sensor data and the non-GNSS sensor data. For example, the GNSS sensor data can include the GNSS-measured speed of the vehicle, and generating the feature data can include deriving GNSS acceleration of the vehicle based on the GNSS-measured speed of the vehicle. In some examples, generating the feature data includes generating a GNSS-implied specific power of the vehicle by multiplying the GNSS-measured speed by the GNSS acceleration. As another example, the GNSS sensor data can include the GNSS-measured heading of the vehicle, and generating the feature data can include deriving GNSS yaw rate of the vehicle based on the GNSS-measured heading of the vehicle. Other feature data can be generated based on the GNSS sensor data and/or the non-GNSS sensor data in some examples.

A reliability of at least a portion of the GNSS sensor data is determined 606 by processing the feature data with a classifier (e.g., the GNSS reliability classifier 124). In some examples, the classifier employs a support vector machine (SVM) model trained to classify the GNSS sensor data as reliable or unreliable based on the feature data. The SVM can use a Gaussian kernel over some or all of the features data. In some examples, the classifier is trained using GNSS and/or non-GNSS sensor data from trips that have been labeled as having GNSS speed spikes (e.g., unreliable GNSS data) and not having GNSS speed spikes (e.g., reliable GNSS data). In some examples, a user (e.g., of the application executing on the mobile device 102) can provide feedback indicating that one or more of their previous trips include (or do not include) unusual speeds (e.g., speed spikes), and the data corresponding to those trips can be used for further training.

In some examples, an assessment of a driver of the vehicle during the trip is generated based at least in part on the GNSS sensor data and the reliability of at least the portion of the GNSS sensor data. In some examples, the assessment includes a score for the driver during the trip, which can be combined with scores from one or more other trips by the driver. Such a score can be calculated based on, for example, a number of speeding events during the trip, a number of speeding events above a particular threshold during the trip, an average or maximum speed for the trip, an average or maximum speed above the speed limit for the trip, or combinations of them, among others. Generating the assessment can include disregarding one or more segments of the portion of the GNSS sensor data that is classified as unreliable.

Figure 7:
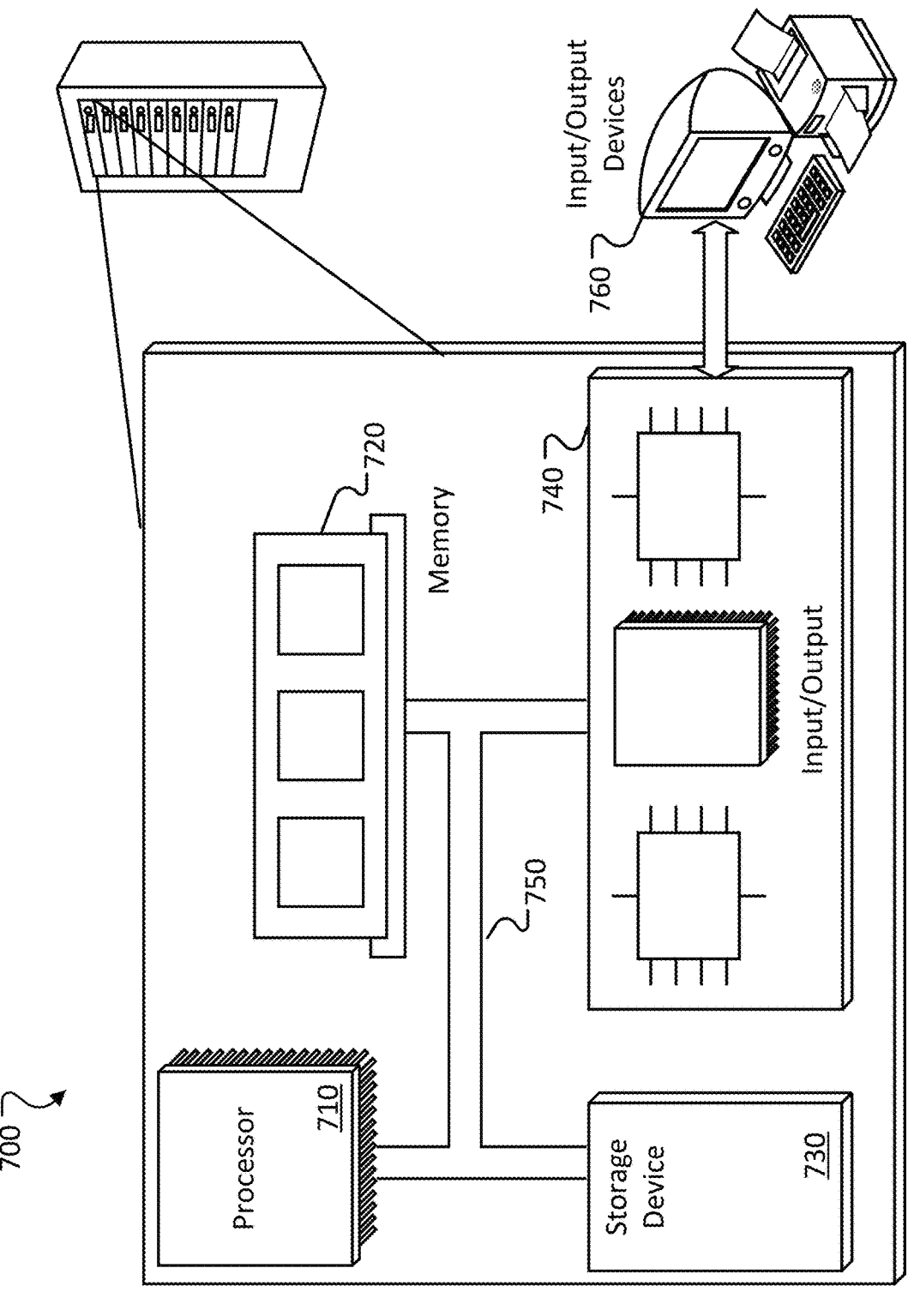
FIG. 7 illustrates an example computer system.

FIG. 7 is a block diagram of an example computer system 700. For example, referring to FIG. 1, the mobile device 102, tag device 104, and data processing system 108 could be an example of the system 700 described here, as could a computer system used by any of the users who access resources of these components. The system 700 includes a processor 710, a memory 720, a storage device 730, and one or more input/output interface devices 740. Each of the components 710, 720, 730, and 740 can be interconnected, for example, using a system bus 750.

The processor 710 is capable of processing instructions for execution within the system 700. The term "execution" as used here refers to a technique in which program code causes a processor to carry out one or more processor instructions. In some implementations, the processor 710 is a single-threaded processor. In some implementations, the processor 710 is a multi-threaded processor. The processor 710 is capable of processing instructions stored in the memory 720 or on the storage device 730. The processor 710 may execute operations such as those described with reference to FIG. 6.

The memory 720 stores information within the system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 can include, for example, a hard disk device, an optical disk device, a solid-state drive, a flash drive, magnetic tape, or some other large capacity storage device. In some implementations, the storage device 730 may be a cloud storage device, e.g., a logical storage device including one or more physical storage devices distributed on a network and accessed using a network. In some examples, the storage device may store long-term data. The input/output interface devices 740 provide input/output operations for the system 700. In some implementations, the input/output interface devices 740 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 700 to communicate, for example, transmit and receive data. In some implementations, the input/output device can include driver devices configured to receive input data and send output data to other input/output devices, e.g., keyboard, printer and display devices 760. In some implementations, mobile computing devices, mobile communication devices, and other devices can be used.

A server, such as the servers shown in FIG. 1, can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 700 is contained within a single integrated circuit package. A system 700 of this kind, in which both a processor 710 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 740.

Although an example processing system has been described in FIG. 7, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method, comprising:
receiving data produced by one or more sensors during a trip within a vehicle, the data comprising global navigation satellite system (GNSS) sensor data and non-GNSS sensor data, wherein the GNSS sensor data specifies GNSS speed;
deriving feature data from the GNSS speed, wherein the feature data is different from the GNSS speed;
processing the feature data and the non-GNSS sensor data with a machine learning model to classify one or more portions of the GNSS speed as reliable or unreliable;
generating an assessment of a driver of the vehicle during the trip based at least in part on the GNSS speed and a reliability of the one or more portions of the GNSS speed, wherein generating the assessment comprises accounting for the reliability of the one or more portions of the GNSS speed when determining whether the driver was speeding; and
providing the assessment to a device, the device being configured to present a graphical map including an annotation associated with the assessment.

2. The method of claim 1, wherein the GNSS speed comprises GNSS-measured speed of the vehicle, and wherein generating the feature data comprises deriving GNSS acceleration of the vehicle based on the GNSS-measured speed of the vehicle.

3. The method of claim 2, wherein generating the feature data comprises generating a GNSS-implied specific power of the vehicle by multiplying the GNSS-measured speed by the GNSS acceleration.

4. The method of claim 1, wherein the GNSS sensor data comprises GNSS-measured heading of the vehicle, and wherein generating the feature data comprises deriving GNSS yaw rate of the vehicle based on the GNSS-measured heading of the vehicle.

5. The method of claim 1, wherein the non-GNSS sensor data comprises one or more of accelerometer data, magnetometer data, or gyroscope data.

6. The method of claim 1, wherein the GNSS sensor data and the non-GNSS sensor data are produced by a mobile device within the vehicle during the trip.

7. The method of claim 6, wherein the GNSS sensor data is received from location services of the mobile device by an application executing on the mobile device.

8. The method of claim 1, wherein the GNSS sensor data is produced by a mobile device within the vehicle during the trip, and the non-GNSS sensor data is produced by a telematics device within the vehicle during the trip.

9. The method of claim 1, wherein the machine learning model comprises a support vector machine model trained to classify the GNSS sensor data as reliable or unreliable based on the feature data.

10. The method of claim 1, wherein generating the assessment of the driver of the vehicle during the trip comprises:
filtering out the one or more portions of the GNSS speed classified as unreliable; and
determining whether the driver was speeding based on the filtered GNSS speed.

11. A system, comprising:
at least one processor; and
memory storing instructions which, when executed by the at least one processor, cause the at least one processor to perform operations comprising:
receiving data produced by one or more sensors during a trip within a vehicle, the data comprising global navigation satellite system (GNSS) sensor data and non-GNSS sensor data, wherein the GNSS sensor data specifies GNSS speed;

deriving feature data from the GNSS speed, wherein the feature data is different from the GNSS speed;

processing the feature data and the non-GNSS sensor data with a machine learning model to classify one or more portions of the GNSS speed as reliable or unreliable;

generating an assessment of a driver of the vehicle during the trip based at least in part on the GNSS speed and a reliability of the one or more portions of the GNSS speed, wherein generating the assessment comprises accounting for the reliability of the one or more portions of the GNSS speed when determining whether the driver was speeding; and providing the assessment to a device, the device being configured to present a graphical map including an annotation associated with the assessment.

12. The system of claim 11, wherein the GNSS speed comprises GNSS-measured speed of the vehicle, and wherein generating the feature data comprises deriving GNSS acceleration of the vehicle based on the GNSS-measured speed of the vehicle.

13. The system of claim 11, wherein the GNSS sensor data is produced by a mobile device within the vehicle during the trip, and the non-GNSS sensor data is produced by a telematics device within the vehicle during the trip.

14. The system of claim 11, wherein the machine learning model comprises a support vector machine model trained to classify the GNSS sensor data as reliable or unreliable based on the feature data.

15. A non-transitory computer-readable medium storing instructions which, when executed by at least one processor, cause the at least one processor to perform operations comprising:

receiving data produced by one or more sensors during a trip within a vehicle, the data comprising global navigation satellite system (GNSS) sensor data and non-GNSS sensor data, wherein the GNSS sensor data specifies GNSS speed;

deriving feature data from the GNSS speed, wherein the feature data is different from the GNSS speed;

processing the feature data and the non-GNSS sensor data with a machine learning model to classify one or more portions of the GNSS speed as reliable or unreliable;

generating an assessment of a driver of the vehicle during the trip based at least in part on the GNSS speed and a reliability of the one or more portions of the GNSS speed, wherein generating the assessment comprises accounting for the reliability of the one or more portions of the GNSS speed when determining whether the driver was speeding; and providing the assessment to a device, the device being configured to present a graphical map including an annotation associated with the assessment.

16. The non-transitory computer-readable medium of claim 15, wherein the GNSS speed comprises GNSS-measured speed of the vehicle, and wherein generating the feature data comprises deriving GNSS acceleration of the vehicle based on the GNSS-measured speed of the vehicle.

17. The non-transitory computer-readable medium of claim 15, wherein the GNSS sensor data is produced by a mobile device within the vehicle during the trip, and the non-GNSS sensor data is produced by a telematics device within the vehicle during the trip.

18. The non-transitory computer-readable medium of claim 15, wherein the machine learning model comprises a support vector machine model trained to classify the GNSS sensor data as reliable or unreliable based on the feature data.

* * * * *